US009942940B2

(12) United States Patent
Ohta

(10) Patent No.: US 9,942,940 B2
(45) Date of Patent: Apr. 10, 2018

(54) WIRELESS COMMUNICATIONS SYSTEM, WIRELESS STATION, BASE STATION, AND COMMUNICATIONS METHOD

(71) Applicant: FUJITSU LIMITED, Kawasaki-shi, Kanagawa (JP)

(72) Inventor: Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/485,668

(22) Filed: Apr. 12, 2017

(65) Prior Publication Data

US 2017/0223681 A1 Aug. 3, 2017

Related U.S. Application Data

(63) Continuation of application No. 14/551,441, filed on Nov. 24, 2014, now Pat. No. 9,661,681, which is a
(Continued)

(51) Int. Cl.
*H04W 72/04* (2009.01)
*H04W 76/04* (2009.01)
(Continued)

(52) U.S. Cl.
CPC ......... *H04W 76/046* (2013.01); *H04W 12/06* (2013.01); *H04W 12/10* (2013.01); *H04W 72/042* (2013.01); *H04W 88/08* (2013.01)

(58) Field of Classification Search
CPC .. H04W 76/046; H04W 88/08; H04W 72/042
(Continued)

(56) References Cited

U.S. PATENT DOCUMENTS 5,627,883 A 5/1997 Maeda et al.
2007/0133043 A1* 6/2007 Maekawa ............... G06F 21/55
358/1.15
(Continued)

FOREIGN PATENT DOCUMENTS

CN 102387492 A 3/2012
EP 2 355 610 A1 8/2011
(Continued)

OTHER PUBLICATIONS

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol specification (Release 10)", Dec. 2011.
(Continued)

*Primary Examiner* — Sam Bhattacharya
(74) *Attorney, Agent, or Firm* — Myers Wolin, LLC

(57) ABSTRACT

A wireless communications system that includes a base station; and a wireless station. The base station, after receiving a first control signal of Radio Resource Control (RRC) protocol including classifying information, configures transition to an RRC connected mode by a second control signal of RRC protocol transmitted from the base station to the wireless station or from the wireless station to the base station, and the wireless station transitions to the connected mode by the second control signal, and upon transition from the connected mode to a state other than the connected mode, stores a wireless parameter and a security parameter that are set by the RRC protocol and used in data communication in the connected mode.

16 Claims, 12 Drawing Sheets

Related U.S. Application Data continuation of application No. PCT/JP2012/063818, filed on May 29, 2012.

(51) Int. Cl.
*H04W 12/06* (2009.01)
*H04W 12/10* (2009.01)
*H04W 88/08* (2009.01)

(58) Field of Classification Search
USPC .......................... 455/452.1, 452.2, 515, 561
See application file for complete search history.

(56) References Cited

U.S. PATENT DOCUMENTS

| | | |
|---|---|---|
| 2007/0287476 A1 | 12/2007 | Jeong et al. |
| 2009/0093280 A1 | 4/2009 | Kitazoe |
| 2010/0050036 A1 | 2/2010 | Chun et al. |
| 2010/0142426 A1 | 6/2010 | Taniuchi et al. |
| 2011/0222450 A1 | 9/2011 | Youssef |
| 2013/0010728 A1 | 1/2013 | Oguchi |
| 2013/0028184 A1 | 1/2013 | Lee et al. |
| 2013/0028227 A1 | 1/2013 | Kim et al. |
| 2013/0148616 A1 | 6/2013 | Takano |
| 2013/0165101 A1 | 6/2013 | Han et al. |
| 2013/0288693 A1 | 10/2013 | Dai et al. |

FOREIGN PATENT DOCUMENTS

| | | |
|---|---|---|
| EP | 2 384 081 A2 | 11/2011 |
| EP | 2 498 552 A1 | 9/2012 |
| JP | 06-053897 A | 2/1994 |
| JP | 2002-158609 A | 5/2002 |
| JP | 2008-199223 A | 8/2008 |
| JP | 2009-534980 A | 9/2009 |
| JP | 2010-510694 A | 4/2010 |
| JP | 2010-514329 A | 4/2010 |
| JP | 2010-130096 A | 6/2010 |
| JP | 2012-80415 A | 4/2012 |
| KR | 10-2011-0081100 A | 7/2011 |
| WO | 94/05094 A1 | 3/1994 |
| WO | 2011-052700 A1 | 5/2011 |
| WO | 2011/083997 A2 | 7/2011 |
| WO | 2011/099725 A2 | 8/2011 |
| WO | 2011-114480 A1 | 9/2011 |
| WO | 2011/129660 A2 | 10/2011 |
| WO | 2012/025825 A2 | 3/2012 |
| WO | 2012/034580 A1 | 3/2012 |
| WO | 2012/041122 A1 | 4/2012 |

OTHER PUBLICATIONS

International Preliminary Report on Patentability for corresponding International Patent Application No. PCT/JP2012/063818 dated Dec. 11, 2014 with English translation.

International Preliminary Report on Patentability with Written Opinion of the International Searching Authority for corresponding International Patent Application No. PCT/JP2012/063818 dated Dec. 11, 2014.

Notice of Preliminary Rejection issued for corresponding Korean Patent Application No. 10-2014-7032713 dated Aug. 17, 2015 with a partial English translation.

Office Action issued for corresponding Japanese Patent Application No. 2014-518135 dated Sep. 8, 2015 with a partial English translation.

Extended European search report, the supplementary European search report and the European search opinion issued for corresponding European Patent Application No. 12877677.0 dated Nov. 2, 2015.

Qualcomm Incorporated, "UE energy consumption and signalling reduction in CELL_FACH", Agenda Item: 10.1.3, 3GPP TSG-RAN2#74, R2-112852, Barcelona, Spain, May 9-13, 2011.

Office Action issued for corresponding Japanese Patent Application No. 2014-518135 dated Jan. 26, 2016 with a partial English translation.

Notice of Final Rejection issued for corresponding Korean Patent Application No. 10-2014-7032713 dated Feb. 23, 2016 with a partial English translation.

Notice of Preliminary Rejection issued for corresponding Korean Patent Application No. 10-2016-7010200 dated Jul. 8, 2016 with an English translation.

Office Action issued by the Japan Patent Office for corresponding Japanese Patent Application No. 2014-518135, dated Nov. 29, 2016, with a partial English translation of the relevant part.

Office Action issued by the Japan Patent Office for corresponding Japanese Patent Application No. 2016-073203, dated Dec. 20, 2016, with a partial English translation of the relevant part.

Notification of Reasons for Refusal issued by the Japan Patent Office for corresponding Japanese Patent Application No. 2016-073203, dated Jun. 20, 2017, with an English translation.

Notice of Preliminary Rejection issued by the Korean Intellectual Property Office for corresponding Korean Patent Application No. 10-2017-7008523, dated Jun. 16, 2017, with English translation.

First Notification of Office Action issued by the State Intellectual Property Office of China for corresponding Chinese Patent Application No. 201280073505.X, dated Jul. 31, 2017, with an English translation.

\* cited by examiner

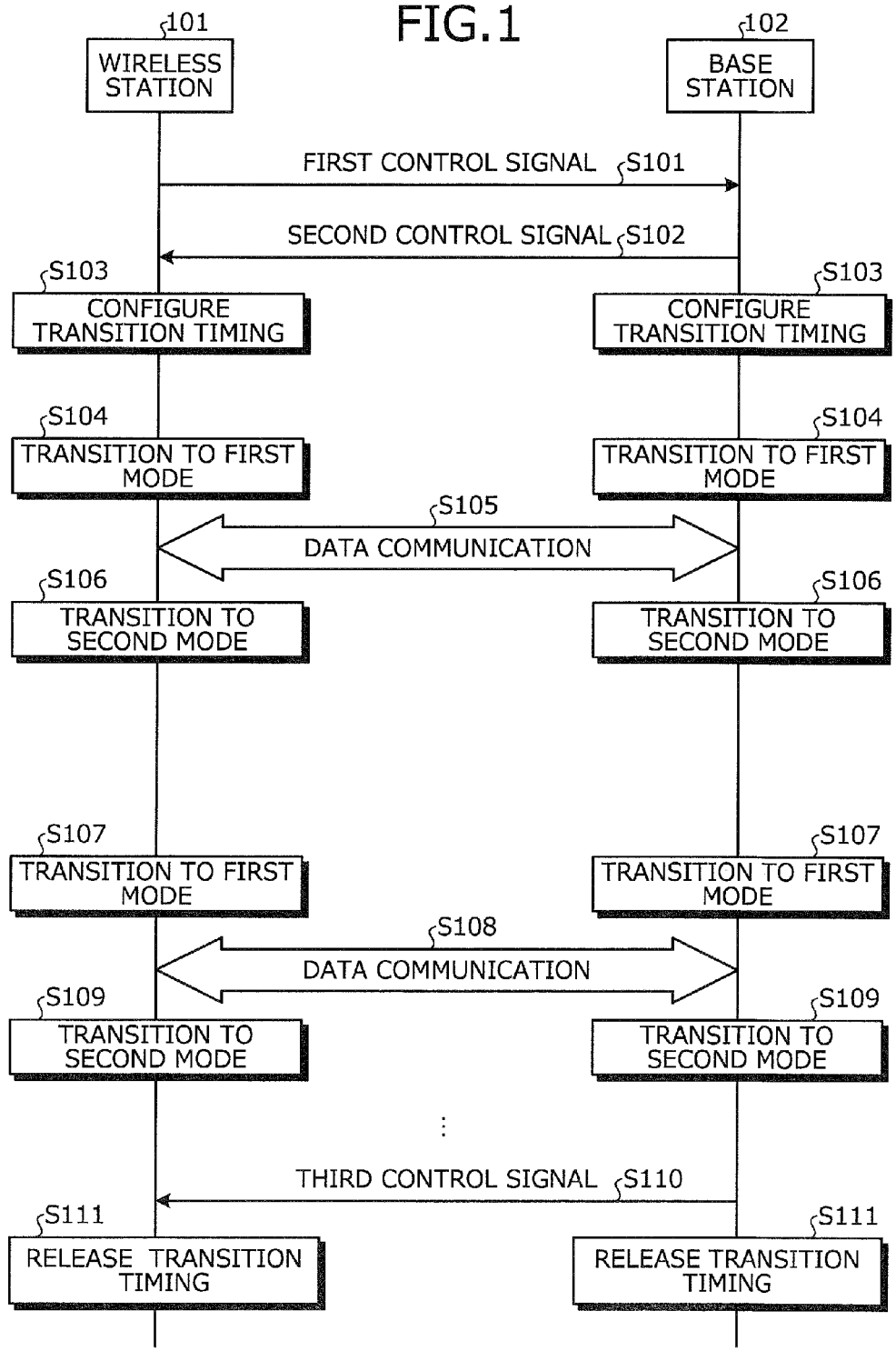

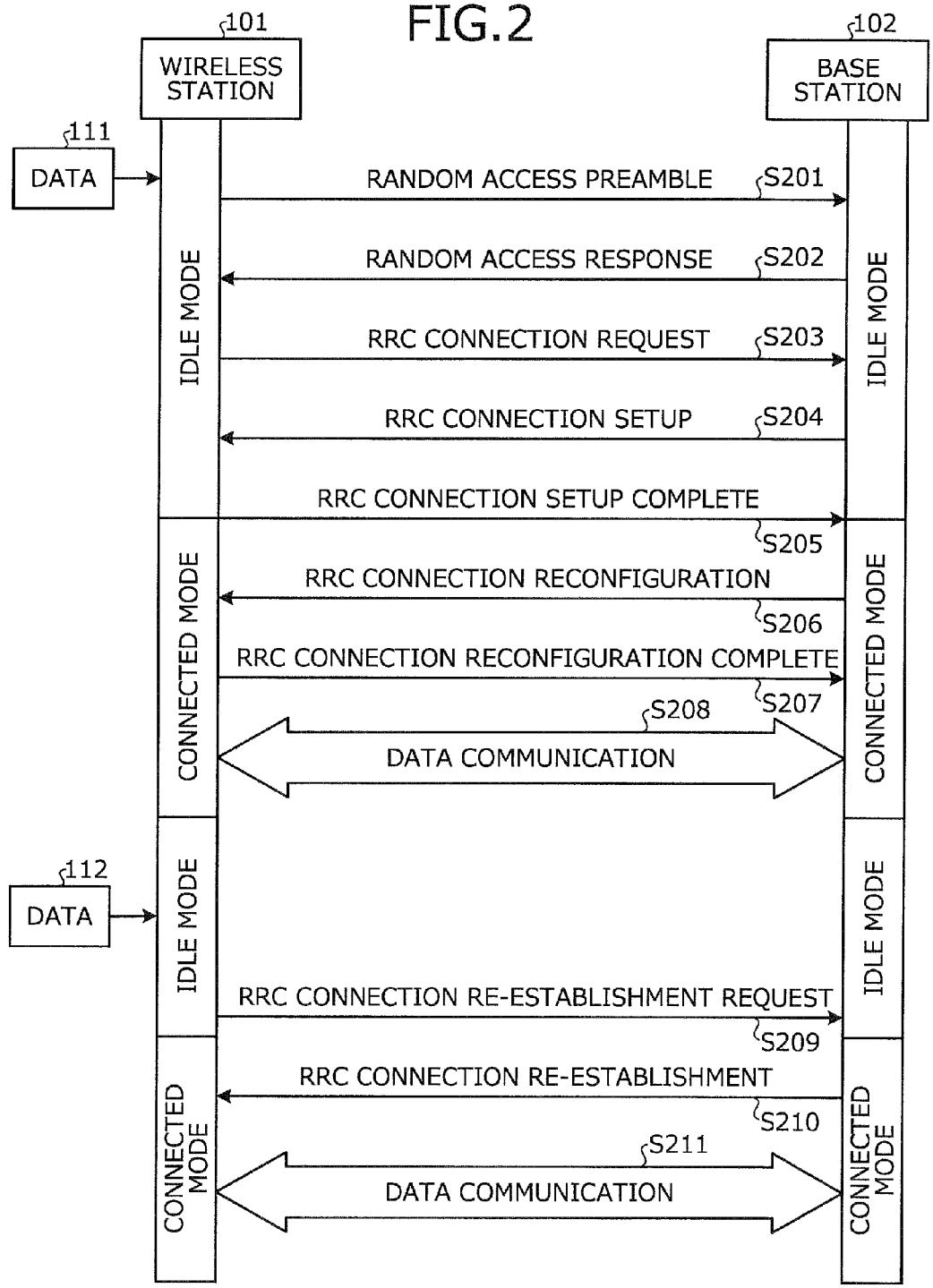

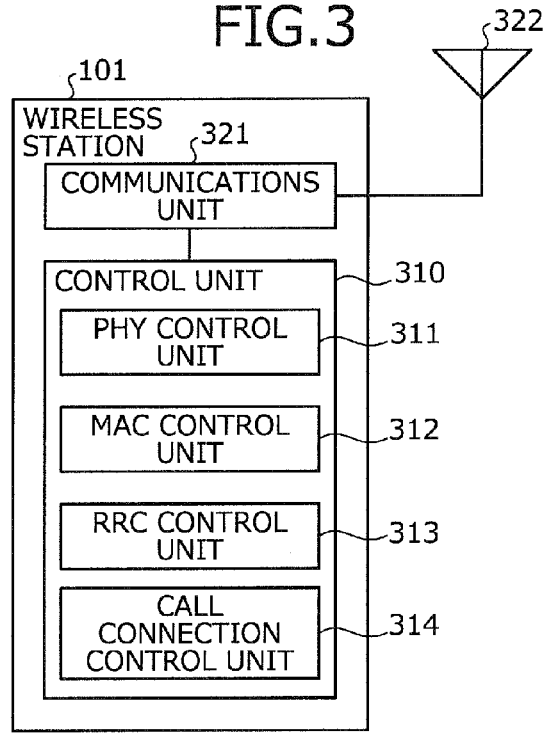
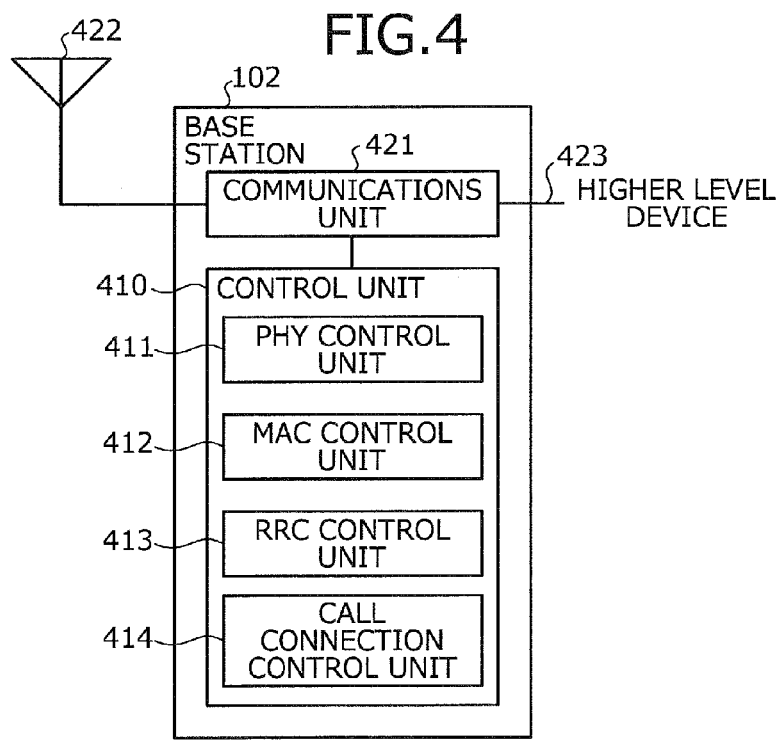

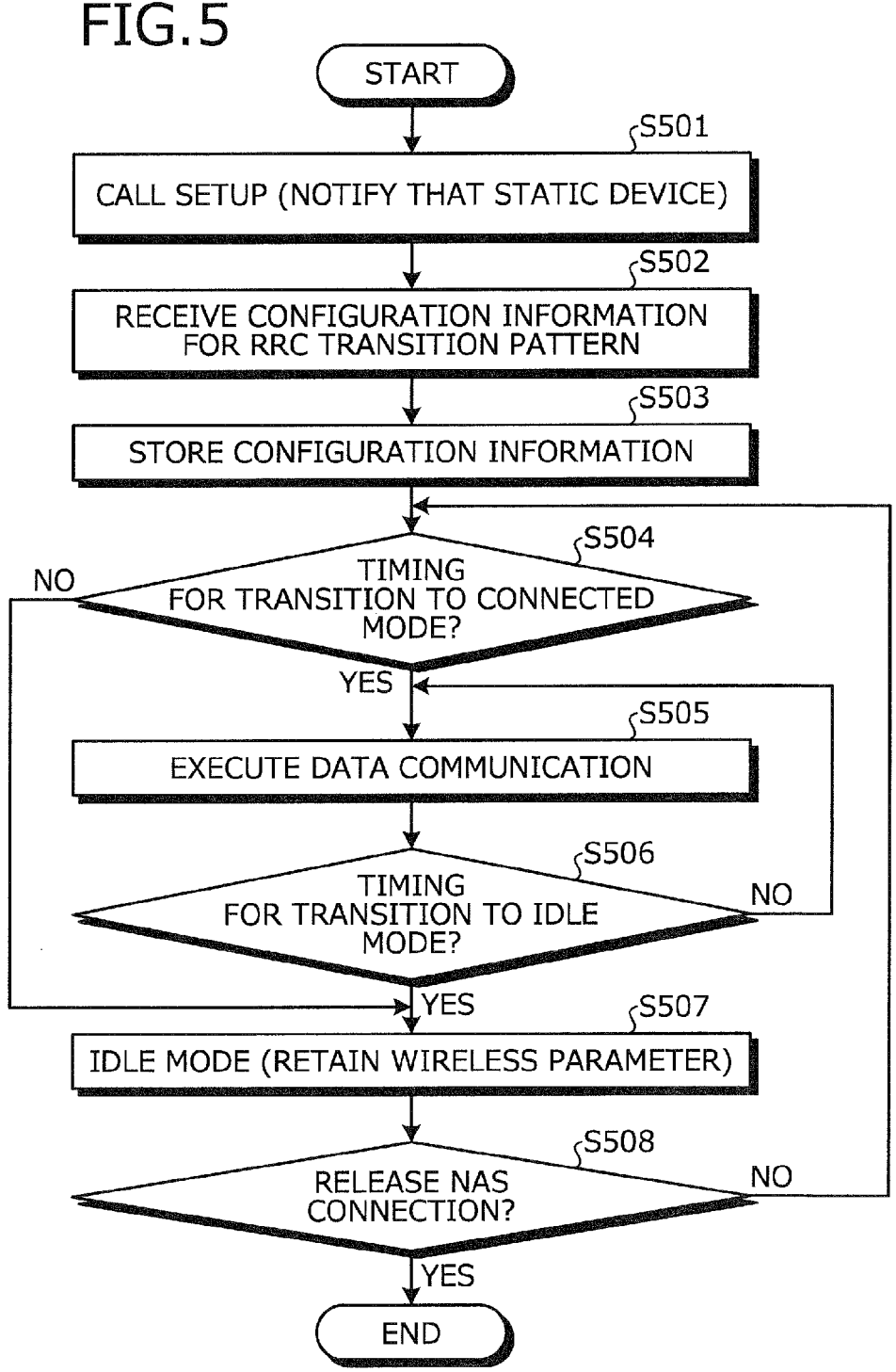

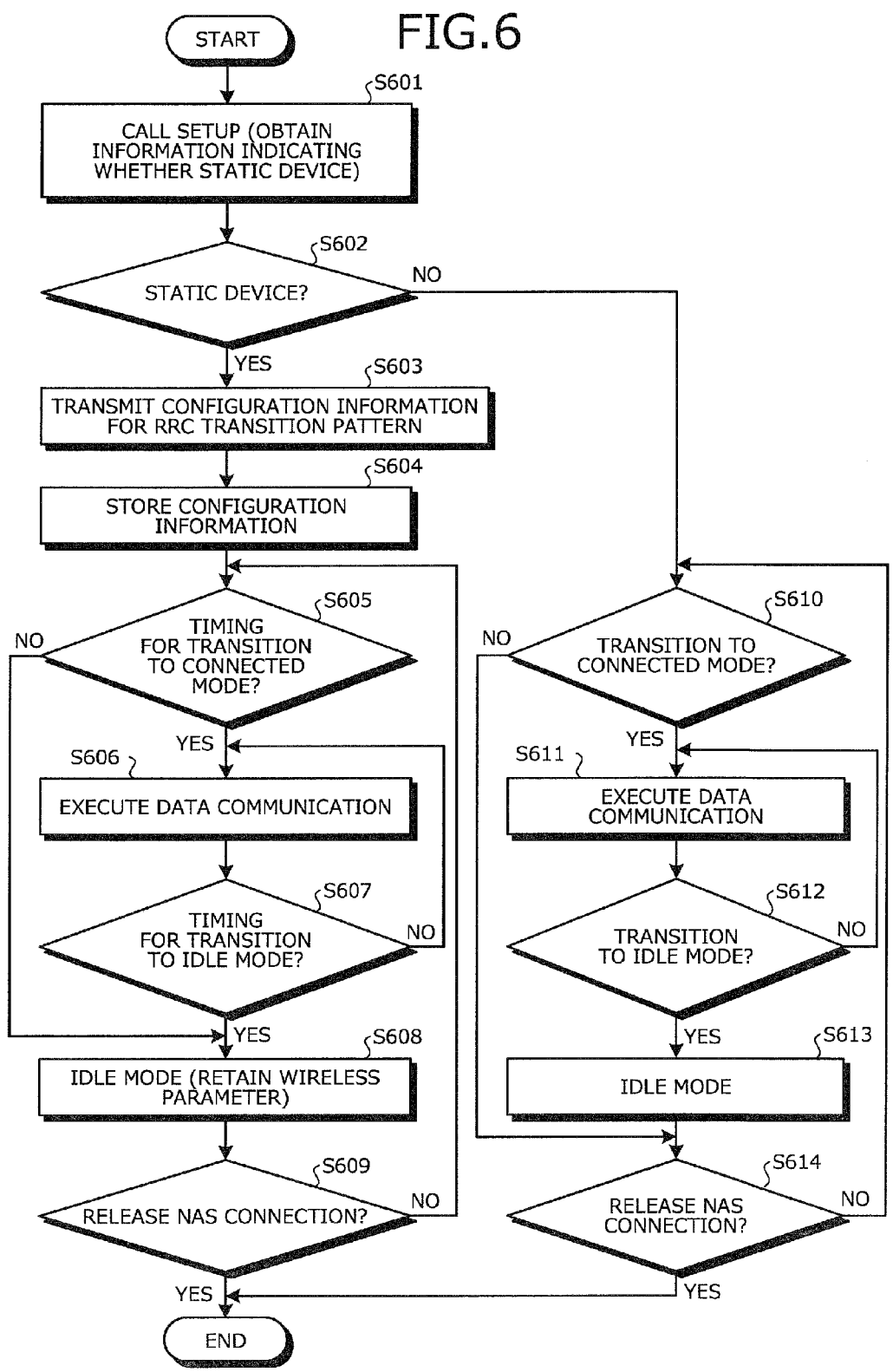

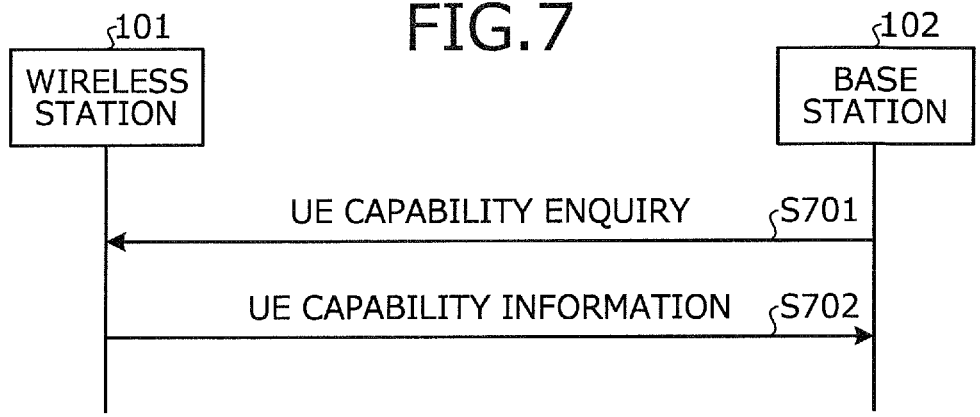

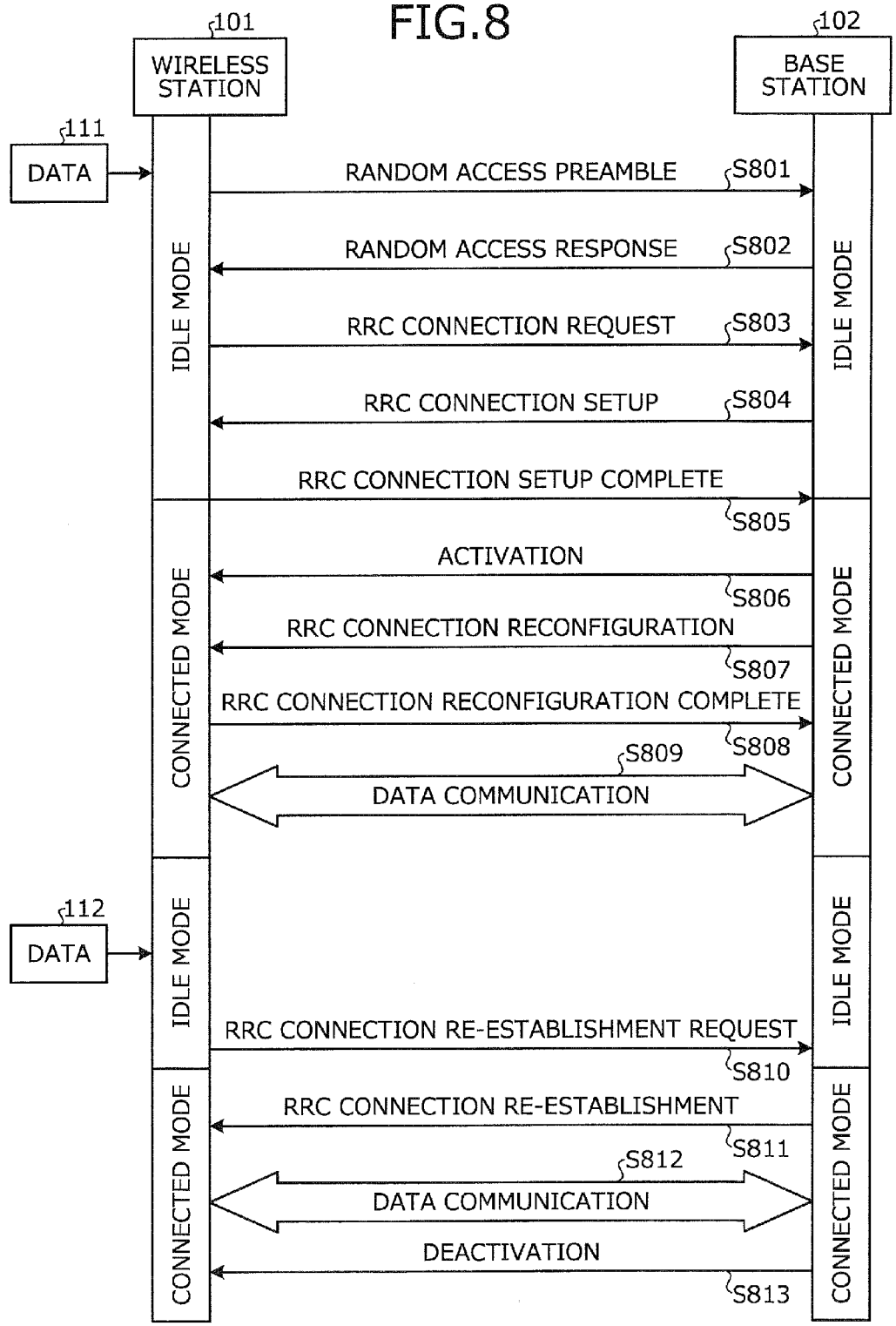

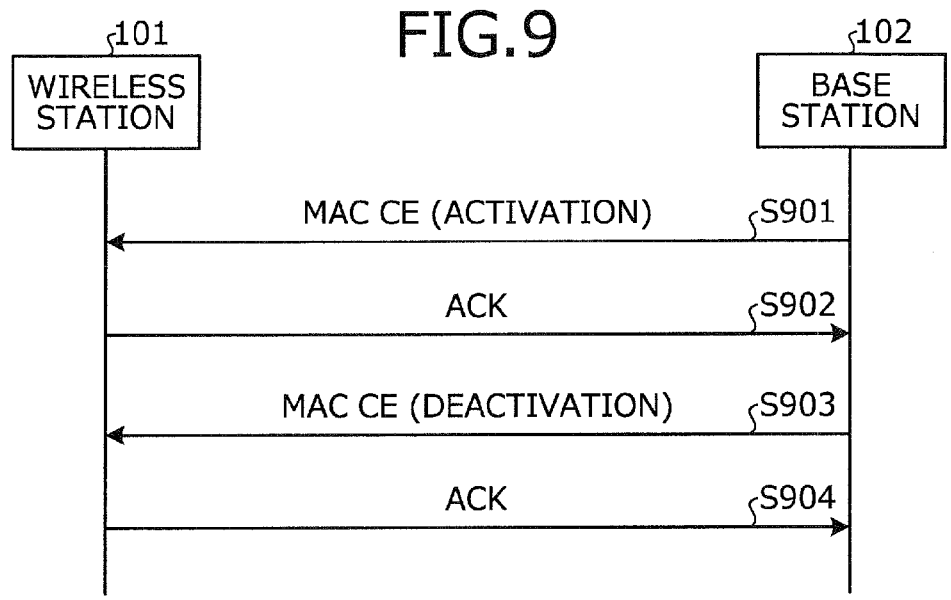

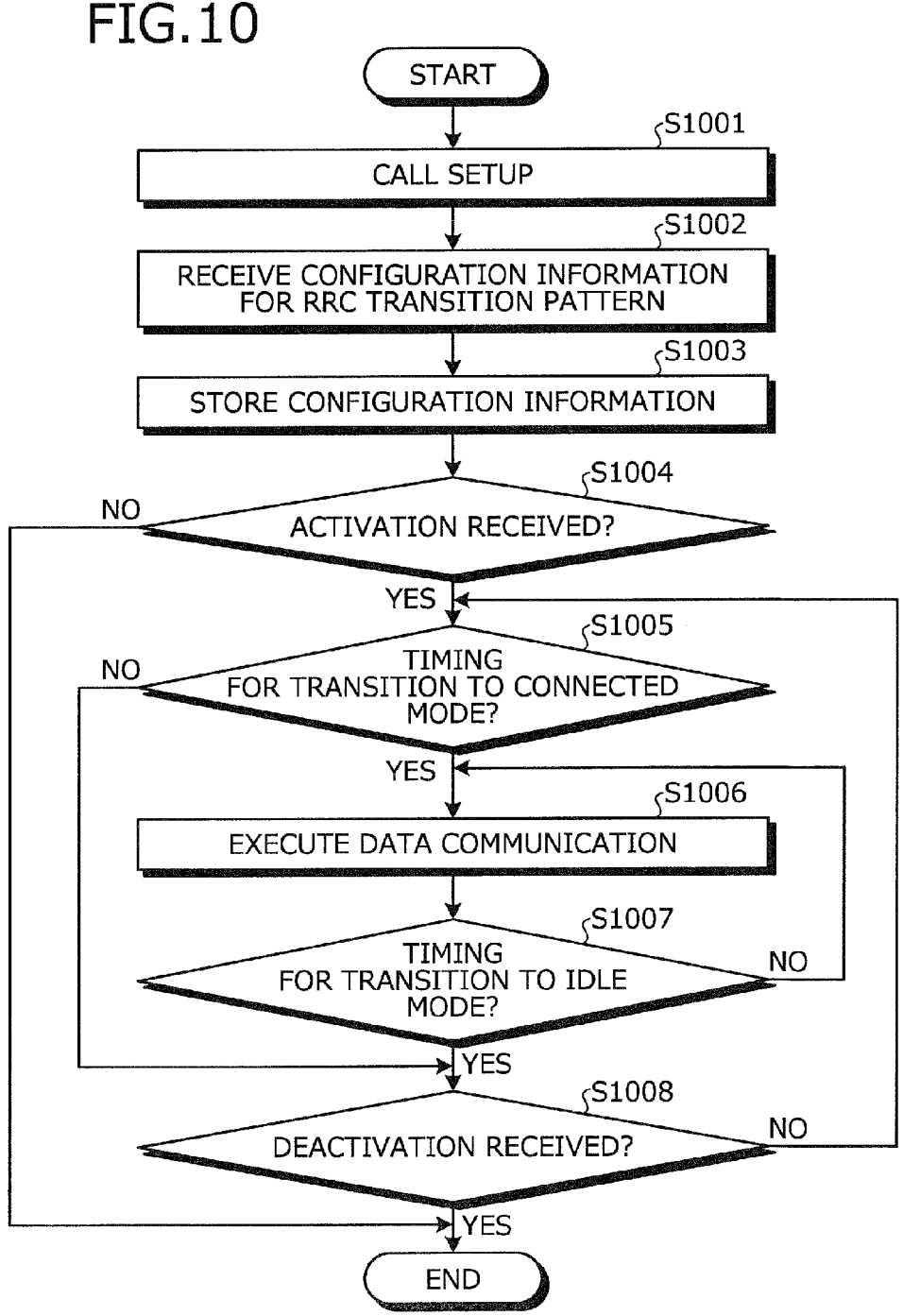

WIRELESS COMMUNICATIONS SYSTEM, WIRELESS STATION, BASE STATION, AND COMMUNICATIONS METHOD

CROSS REFERENCE TO RELATED APPLICATIONS

This application is a continuation application of U.S. application Ser. No. 14/551,441, filed Nov. 24, 2014 which is a continuation application of International Application PCT/JP2012/063818, filed on May 29, 2012 and designating the U.S., the entire contents of each are incorporated herein by reference.

FIELD

The embodiments discussed herein are related to a wireless communications system, a wireless station, a base station, and a communications method.

BACKGROUND

In wireless communications systems, processing is performed at the radio resource control (RRC) layer and includes the configuration, reconfiguration, and release of connections between wireless stations and base stations (for example, refer to Japanese Laid-Open Patent Publication No. 2008-199223 and Published Japanese-Translation of PCT Application, Publication No. 2010-514329). For example, under the 3rd Generation Partnership Project (3GPP), an RRC connected mode (RRC Connected) and a RRC idle mode (RRC Idle) are specified as states of the RRC layer (for example, refer to 3GPP T536.331, "Radio Resource Control (RRC) Protocol Specification", V10.4.0, Release 10, December 2011). The RRC connected mode, for example, is a state in which data communication can be implemented between a wireless station and a base station. The RRC idle mode, for example, is a state in which data communication between a wireless station and a base station is not possible.

Nonetheless, with the conventional technologies above, even if the communication time is short or if a small amount of data is transmitted, overhead for a control signal arises accompanying the transition of the communication state and therefore, efficient communication cannot be performed in some cases.

SUMMARY

According to an aspect of an embodiment, a wireless communications system includes a base station; and a wireless station. The base station, after receiving a first control signal that includes classifying information, configures by a second control signal, transition of a communication mode and releases by a third control signal, the transition of the communication mode. The wireless station performs transition of a mode of communication by the communication mode configured by the second control signal, and releases by the third control signal, the transition of the communication mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a sequence diagram depicting one example of operation of a wireless communications system according to a first embodiment;

FIG. 2 is a sequence diagram depicting one example of operation of the wireless communications system according to a second embodiment;

FIG. 3 is a diagram depicting one example of a configuration of a wireless station;

FIG. 4 is a diagram depicting one example of a configuration of a base station;

FIG. 5 is a flowchart depicting one example of operation of the wireless station according to the second embodiment;

FIG. 6 is a flowchart depicting one example of operation of the base station according to the second embodiment;

FIG. 7 is a sequence diagram depicting one example of operation of obtaining UE capability;

FIG. 8 is a sequence diagram depicting one example of operation of the wireless communications system according to a fourth embodiment;

FIG. 9 is a sequence diagram depicting one example of operation of transmission/reception of a MAC CE;

FIG. 10 is a flowchart depicting one example of operation of the wireless station according to the fourth embodiment;

DESCRIPTION OF EMBODIMENTS

Figure 11:
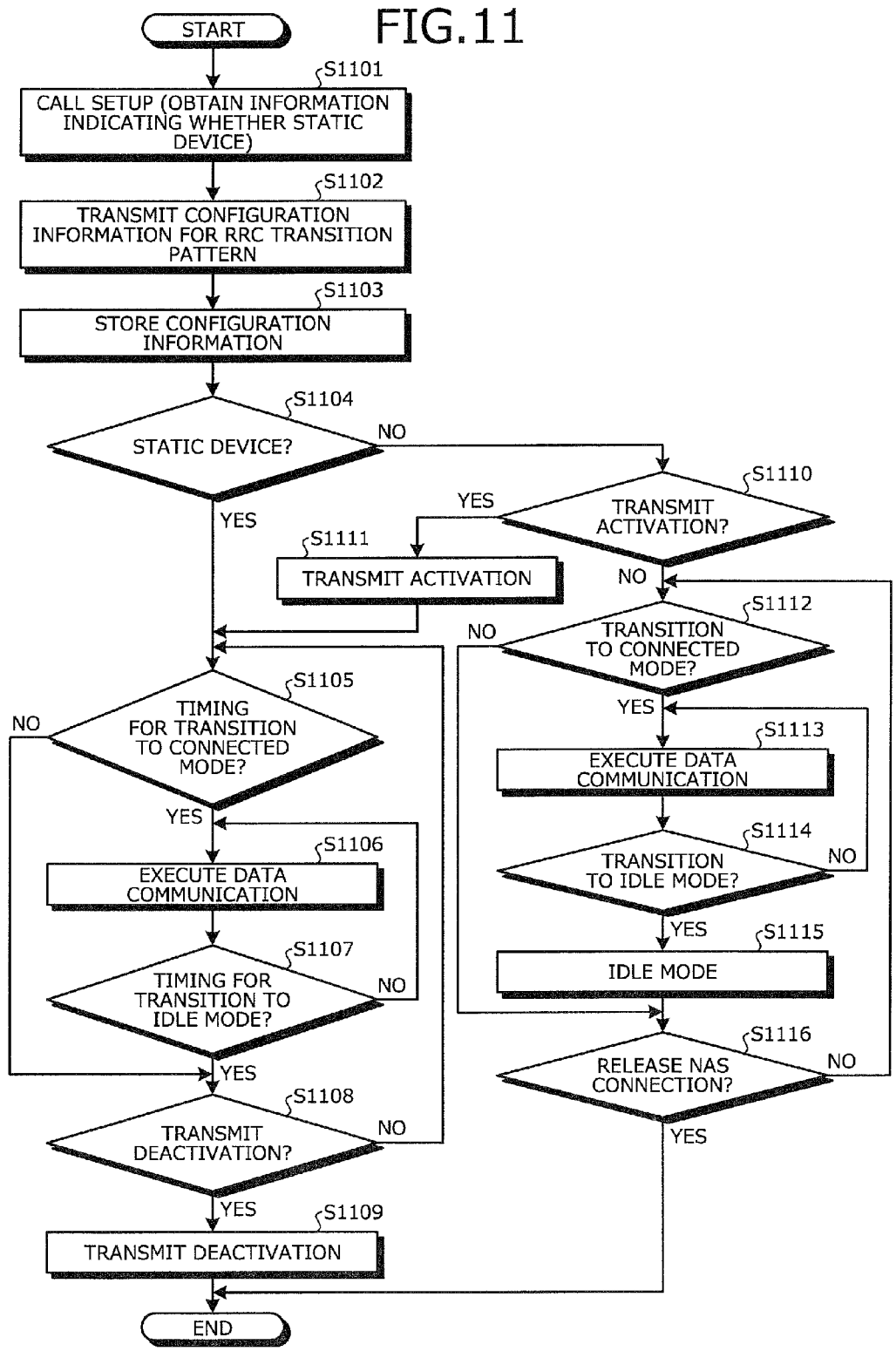
FIG. 11 is a flowchart depicting one example of operation of the base station according to the fourth embodiment.

Embodiments of a wireless communications system, a wireless station, a base station, and a communications method according to the present invention will be described in detail with reference to the accompanying drawings.

FIG. 1 is a sequence diagram depicting one example of operation of the wireless communications system according to a first embodiment. The wireless communications system according to the first embodiment includes a wireless station 101 and a base station 102 depicted in FIG. 1. The base station 102 is, for example, an evolved Node B (eNB) or a Home eNB which deploys a femtocell. The wireless station 101 is, for example, a mobile station such as a user terminal (User Equipment (UE)). The wireless station 101 and the base station 102 wirelessly communication with each other.

The wireless station 101 transmits to the base station 102, a first control signal that includes classifying information (step S101). Classifying information is information indicating that the wireless station 101 is a specific classification (e.g., a static device).

The base station 102 transmits to the wireless station 101, a second control signal that configures the timing of transition to the communication mode (step S102). More specifically, the base station 102 determines the timing of transition of the wireless station 101 and the base station 102 to the first mode. The base station 102 transmits to the wireless station 101, the second control signal that indicates the determined timing of transition. The first mode is a communication mode in which data communication is possible, e.g., the connected mode (connected). The timing of transition to the first mode includes multiple transition timings and for example, is the timing of a constant cycle. The wireless station 101 and the base station 102 respectively configure therein, the transition timing indicated by the second control signal transmitted at step S102 (step S103).

The wireless station 101 and the base station 102 transition to the first mode (step S104). The wireless station 101 and the base station 102 perform data communication with each other (step S105). The wireless station 101 and the base station 102 transition to a second mode (step S106). The second mode is a non-communication mode in which data communication is not possible, e.g., the idle mode (idle).

When the transition timing configured at step S103 arrives, the wireless station 101 and the base station 102 transition to the first mode in which data communication is possible (step S107). The wireless station 101 and the base station 102 perform data communication with each other (step S108). The wireless station 101 and the base station 102 transition to the second mode in which data communication is not possible (step S109). Subsequently, the wireless station 101 and the base station 102 execute steps S107 to S109, each time the transition timing configured at step S103 arrives.

The base station 102 transmits a third control signal to the wireless station 101, at an arbitrary timing (step S110). The third control signal is a signal instructing release of the transition timing configured at step S103. The wireless station 101 and the base station 102 release the transition timing configured at step S103 (step S111), ending a series of operations.

Thus, at the predetermined transition timing (step S102, S103), the wireless station 101 and the base station 102 transition to the first mode, thereby enabling reduction of the control signal overhead accompanying state transition. For example, at step S107, notification of the timing of transition to the first mode does not have to be newly given to the wireless station 101 from the base station 102, thereby enabling reduction of the control signal overhead accompanying state transition and facilitating communication efficiency. For example, reduction of the power consumption of the wireless station 101 and the base station 102 can be facilitated.

The wireless station 101 is, for example, a wireless communications apparatus that periodically transmits a small amount of data. In this case, if notification of the timing of transition to the first mode is given to the wireless station 101 by the base station 102 each time data is transmitted, the control signal overhead for the data to be transmitted becomes large, making efficient communication impossible. In contrast, at the predetermined transition timing (step S102, S103), the wireless station 101 and the base station 102 transition to the first mode multiple times, whereby the control signal overhead for the data to be transmitted becomes relatively smaller, enabling efficient communications.

Further, the wireless station 101 and the base station 102 may store a wireless parameter used in the data communication at step S105. A wireless parameter is, for example, a parameter that indicates a communication scheme such as a modulation scheme or coding scheme. The wireless station 101 and the base station 102 also use the stored wireless parameter in the data communication at step S108. Thus, the wireless station 101 and the base station 102 can communicate data at multiple timings, by the same wireless parameter. As a result, the control signal overhead accompanying state transition can be reduced.

For example, notification of the wireless parameter used in the data communication at step S108 does not have to be given to the wireless station 101 by the base station 102, thereby enabling reduction of the control signal overhead accompanying state transition. Further, since random access does not have to be performed for the data communication at step S108, reduction of the control signal overhead accompanying state transition is possible. Therefore, communication efficiency can be facilitated.

The wireless station 101 is, for example, a stationary wireless communications apparatus that is fixed at a given location and performs wireless communication. In this case, changes in the wireless environment of the wireless station 101 and the base station 102 are small and therefore, even if the wireless parameter is not updated each time data is communicated, stable wireless communication can be performed between the wireless station 101 and the base station 102.

The data communication at steps S105, S108 may be the transmission of uplink data from the wireless station 101 to the base station 102, or the transmission of downlink data from the base station 102 to the wireless station 101. Further, the data communication at steps S105, S108 may be both the transmission of uplink data from the wireless station 101 to the base station 102 and the transmission of downlink data from the base station 102 to the wireless station 101.

Thus, according to the wireless communications system of the first embodiment, the base station 102, after receiving the first control signal that includes classifying information indicating the classification of the wireless station 101, configures the communication mode transition timing via the second control signal. Further, the configured communication mode transition timing is released by the third control signal transmitted by the base station 102. As a result, when the wireless station 101 is of a given classification, the control signal overhead accompanying state transition is reduced, enabling communication efficiency to be facilitated. For example, reduced power consumption of the wireless station 101 and the base station 102 can be facilitated.

Here, as one example, a wireless communications system that includes the wireless station 101 and the base station 102 has been described. Nonetheless, architecture of the wireless communications system is not limited hereto. For example, in the wireless communications system depicted in FIG. 1, another example of architecture may be such that a relay station is deployed in place of the wireless station 101. Alternatively, in the wireless communications system depicted in FIG. 1, a relay station may be deployed in place of the base station 102.

Further, although a case has been described where the transition timing of the wireless station 101 and the base station 102 is configured by the transmission of the second control signal from the base station 102 to the wireless station 101, operation is not limited hereto. For example, the transition timing of the wireless station 101 and the base station 102 may be configured by the transmission of the second control signal from the wireless station 101 to the base station 102. In this case, the transition timing of the wireless station 101 and the base station 102 is determined by the wireless station 101.

Further, although a case has been described where the configuration of the transition timing is released by the transmission of the third control signal from the base station 102 to the wireless station 101, operation is not limited hereto. For example, the configuration of the transition timing may be released by the transmission of the third control signal from the wireless station 101 to the base station 102. In this case, the timing at which the configured transition timing is released is determined by the wireless station 101.

One example of a system to which the wireless communications system depicted in FIG. 1 is applied will be described. The wireless communications system depicted in FIG. 1 is, for example, applicable to Long Term Evolution (LTE). Under LTE, a scheme based on orthogonal frequency division multiplexing (OFDM) is specified as a wireless access technique.

Under LTE, high-speed, wireless packet communication is possible, where the peak downlink transmission rate is 100 [Mb/s] or greater, and the peak uplink transmission rate is 50 [Mb/s] or greater. Aiming to realize even faster communication, the 3rd Generation Partnership Project (3GPP), an international standardizing body, has begun investigating LTE-Advanced (LTE-A) for wireless mobile communications systems, based on LTE.

The wireless communications system depicted in FIG. 1 can be applied to LTE-A. Under LTE-A, a peak downlink transmission rate of 1 [Gb/s] is targeted, a peak uplink transmission rate of 500 [Mb/s] is targeted, and technological investigation of wireless access schemes and network architecture is being conducted.

Under LTE-A (or LTE Rel-11), wireless stations which generate traffic that differs from the traffic observed in conventional systems are connected. For example, communication is assumed where various types of stationary, static devices such as electricity meters including sensors and gas meters are connected to a cellular network and perform communication. Such communication is called machine-type communication.

Communication with a fixed timing can be given as one characteristic of traffic occurring with machine-type communication. For example, an electricity meter and a gas meter periodically transmit to a server, reports concerning the amount of electricity and gas used. Relatively low traffic volume is another quality of the traffic occurring with machine-type communication.

Yet another characteristic of the traffic occurring with machine-type communication is that the static devices do not move, eliminating the importance of system design that considers mobility, which is the point of mobile communication.

FIG. 2 is a sequence diagram depicting one example of operation of the wireless communications system according to a second embodiment. The wireless station 101 and the base station 102 of the wireless communications system according to the second embodiment, for example, execute the following steps. During the initial state, the wireless station 101 and the base station 102 are both assumed to be in an idle state.

When data 111 that is to be transmitted to the base station 102 arrives, the wireless station 101 transmits a random access preamble to the base station 102 (step S201). In response, the base station 102 determines based on the reception timing of the random access preamble, the transmission timing of the uplink signal from the wireless station 101. The determination of the transmission timing of the uplink signal from the wireless station 101 can be performed, for example, based on a timing difference of a reception window of the base station 102 and the timing at which the preamble is received. The base station 102 transmits to the wireless station 101, a random access response that includes information indicating the determined transmission timing (step S202).

Consequent to the random access procedures at steps S201, S202, synchronization is established in the L1 layer (physical layer) and L2 layer (media access control layer) of the wireless station 101 and the base station 102.

The wireless station 101 transmits to the base station 102, a call connection request (RRC connection request) that includes an identifier of the wireless station 101 and the reason for connection (step S203). Further, the wireless station 101, via the RRC connection request at step S203, notifies the base station 102 that the wireless station 101 is a static device.

Thus, based on the identifier of the wireless station 101 obtained from the RRC connection request, the base station 102 identifies the wireless station that has come to be connected. In an attempt to setup RRC, the base station 102 transmits to the wireless station 101, a call connection setup (RRC connection setup) that includes a wireless parameter (step S204). The wireless parameter is, for example, a parameter that indicates the communications scheme such as a modulation scheme or a coding scheme. Further, by the RRC connection setup at step S204, the base station 102 notifies the wireless station 101 of the timing of transition to the connected mode from the idle mode.

In response, when the configuration of the wireless parameter included in the RRC connection setup is completed, the wireless station 101 transitions to step S205. In other words, the wireless station 101 transmits call connection setup complete (RRC connection setup complete) to the base station 102 (step S205). As a result, RRC connection between the wireless station 101 and the base station 102 is established, and the RRC state of the wireless station 101 and the base station 102 transitions to the connected mode from the idle mode.

Next, the base station 102 transmits to the wireless station 101, RRC connection reconfiguration for configuring reconnection (step S206). Next, the wireless station 101 transmits RRC connection reconfiguration complete to the base station 102 (step S207).

The wireless station 101 and the base station 102 execute data communication (step S208). For example, at step S208, the data 111 arising at step S201 is transmitted from the wireless station 101 to the base station 102. Subsequently, the wireless station 101 and the base station 102 transition from the connected mode to the idle mode.

Next, new data 112 that is to be transmitted to the base station 102 is assumed to arrive at the wireless station 101. Thus, the wireless station 101 waits until the timing for the transition to the connected mode, notified at step S204. The wireless station 101 transmits to the base station 102, a RRC connection re-establishment request that is a request for reconnection (step S209). Consequently, the wireless station 101 and the base station 102 transition to the connected mode from the idle mode.

Next, the base station 102 transmits RRC connection re-establishment to the wireless station 101 (step S210). The wireless station 101 and the base station 102 execute data communication (step S211). For example, at step S211, the data 112 arising at step S209 is transmitted from the wireless station 101 to the base station 102. Subsequently, the wireless station 101 and the base station 102 transition to the idle mode from the connected mode.

In the case of a transition, a request to re-establish connection is issued to establish security. More specifically, the wireless station 101 transmits to the base station 102, a parameter related to security, via an RRC connection re-establishment request. Thus, it is desirable that the wireless station 101, even while in the idle mode, stores to the memory, these parameters related to security.

The parameters related to security, for example, include a cell-radio network temporary identity (C-RNTI), a short message authentication code for integrity (short MAC-I), a physical cell identity (PCID), etc.

A short MAC-I is a parameter used for verifying integrity of data (verifying that information is without errors). The short MAC-I, for example, is included in the RRC connection re-establishment request at step S209. The base station 102 uses the MAC-I to verify the integrity of RRC connection re-establishment request.

The short MAC-I, for example, is generated by calculating the ID of the cell in which the wireless station 101 is located or the C-RNTI of the wireless station 101 by a security algorithm shared by the wireless station 101 and the base station 102. The ID of the cell in which the wireless station 101 is located, for example, includes the ID of the cell in which the wireless station 101 was located before issuing the RRC connection re-establishment request and/or the ID of the cell in which the wireless station 101 was located when issuing the RRC connection re-establishment request.

For the notification that the wireless station 101 is a static device at step S203, for example, a "delay Tolerant Access-v1020" in the RRC connection request can be used. Further, for the notification that the wireless station 101 is a static device, a parameter newly specified the RRC connection request may be used. For example, "nm-Access" (non mobile access) may be specified in the "spare2" field of the RRC connection request, whereby notification that the wireless station 101 is a static device is given by "nm-Access".

The timing of transition from the connected mode to the idle mode, for example, can be the timing when a constant period elapses after the transition from the idle mode to the connected mode. In this case, the data communication at steps S208, S211 is completed by the time the constant period elapses after the transition from the idle mode to the connected mode.

Alternatively, the timing of transition from the connected mode to the idle mode can be the timing at which data is transmitted/received after a given period or greater during the connected mode. For example, during the connected mode, the wireless station 101 and the base station 102 restart a timer at each transmission/reception of data and when the timer expires, transition to the idle mode. Thus, the period during which the connected mode is maintained can be established according to the state of communication.

Further, the RRC connection reconfiguration at step S206 may be used in the notification of the timing of the transition to the connected mode from the idle mode. When notification of the timing of transition to the connected mode from the idle mode is given, notification of the timing of transition from the connected mode to the idle mode may also be given to the wireless station 101 by the base station 102.

FIG. 3 is a diagram depicting one example of a configuration of the wireless station. As depicted in FIG. 3, the wireless station 101, for example, includes a control unit 310, a communications unit 321, and an antenna 322. The communications unit 321, via the antenna 322, performs transmission/reception processing of wirelessly transmitted signals. The communications unit 321, for example, processes radio frequency (RF) signals.

The control unit 310 performs various types of control of the wireless station 101. The control unit 310, for example, is a baseband processing unit that processes baseband signals. The control unit 310 includes a PHY control unit 311, a MAC control unit 312, an RRC control unit 313, and a call connection control unit 314.

The PHY control unit 311 processes signals when wireless transmission is performed. For example, the PHY control unit 311 performs wireless transmission according to the modulation and coding of a wireless signal notified by the base station 102. The MAC control unit 312 performs a process related to data scheduling based on wireless resources and timings instructed by the base station 102.

The RRC control unit 313 controls the operation of the wireless station 101. For example, the RRC control unit 313 configures the wireless resource parameter (e.g., call setup) used for communication, and manages the communication state of the wireless station 101. Further, the RRC control unit 313 performs a process to transition from the RRC idle mode to the RRC connected mode to enable communication, a handover process to connect to a suitable base station, etc. Further, the RRC control unit 313 performs a process of notifying the base station 102 that the wireless station 101 is a static device, via the RRC connection request.

The call connection control unit 314 controls management of the RRC state by the RRC control unit 313, according to the classification of the wireless station 101 and traffic type.

FIG. 4 is a diagram depicting one example of a configuration of the base station. As depicted in FIG. 4, the base station 102 includes a control unit 410, a communications unit 421, an antenna 422, and a physical-line interface 423. The communications unit 421 transmits and receives wirelessly transmitted signals, via the antenna 422. Via the physical-line interface 423, the communications unit 421 further transmits and receives signals transmitted by a physical line for communication with higher level devices. The communications unit 421, for example, performs transmission/reception processing of RF signals.

The control unit 410 performs various types of control of the base station 10. The control unit 410, for example, is a baseband processing unit that processes baseband signals. The control unit 410 includes a PHY control unit 411, a MAC control unit 412, an RRC control unit 413, and a call connection control unit 414.

The PHY control unit 411 processes signals when wireless transmission is performed. For example, the PHY control unit 411 determines the modulation and coding scheme of wireless signals. The MAC control unit 412 performs a process related to data scheduling.

The RRC control unit 413 controls the operation of the base station 102. For example, the RRC control unit 413 configures the wireless resource parameter (e.g., call setup) used for communication, and manages the communication state of the base station 102. For example, the RRC control unit 413 performs a process to transition from the idle mode to the connected mode to enable communication, and a handover process for connection to a suitable base station. Further, the RRC control unit 413 obtains, by RRC connection request, information indicating that the wireless station 101 is a static device.

The call connection control unit 414 identifies the classification of the wireless station 101 and traffic type, and controls the management of the RRC state, based on the identification results.

(Operation of Wireless Station)

FIG. 5 is a flowchart depicting one example of operation of the wireless station according to the second embodiment. The wireless station 101, for example, executes the following steps. The wireless station 101 performs call setup with the base station 102 (step S501). The call setup at step S501, for example, corresponds to the operations at steps S201 to S205 depicted in the FIG. 2. Further, the wireless station 101, via the RRC connection request in the call setup at step S501, notifies the base station 102 that the wireless station 101 is a static device.

The wireless station 101 receives from the base station 102, configuration information for an RRC transition pattern (step S502). An RRC transition pattern is, for example, the transition timing of the RRC state. The wireless station 101 stores to the memory, the configuration information received at the step S502, for the RRC transition pattern (step S503).

The wireless station 101 judges based on the configuration information stored at step S503, whether the current time is the transition timing for transitioning to the connected mode (step S504). If the current time is not the transition timing for transitioning to the connected mode (step S504: NO), the wireless station 101 proceeds to step S507.

At step S504, if the current time is the transition timing for transitioning to the connected mode (step S504: YES), the wireless station 101 transitions to the connected mode and executes data communication with the base station 102 (step S505). The data communication at step S505, for example, includes the scheduling of data communication by the MAC control unit 312, the transmission or reception of radio waves by the PHY control unit 311, etc.

The wireless station 101 judges based on the configuration information stored at step S503, whether the current time is the transition timing for transitioning to the idle mode (step S506). If the current time is not the transition timing for transitioning to the idle mode (step S506: NO), the wireless station 101 returns to step S505, and continues perform the data communication.

At step S506, if the current time is the transition timing for transitioning to the idle mode (step S506: YES), the wireless station 101 transitions to the idle mode (step S507). Here, the wireless station 101 retains the wireless parameter configured in the call setup at step S501, and uses the same wireless parameter in the next transition to the connected mode. At step S507, if the wireless station 101 is already in the idle mode, the wireless station 101 maintains the idle mode.

The wireless station 101 judges whether to release (detach) a non-access stratum (NAS) connection (step S508). If the NAS connection is not to be released (step S508: NO), the wireless station 101 returns to step S504. If the NAS connection is to be released (step S508: YES), the wireless station 101 ends a series of operations.

FIG. 6 is a flowchart depicting one example of operation of the base station according to the second embodiment. The base station 102, for example, executes the following steps. The base station 102 performs call setup with the wireless station 101 (step S601). The call setup at step S601, for example, corresponds to the operations at steps S201 to S205 depicted in FIG. 2. Further, the base station 102, via the RRC connection request in the call setup at step S601, obtains from the wireless station 101, information indicating whether the wireless station 101 is a static device.

The base station 102 judges based on the information obtained in the call setup at step S601, whether the wireless station 101 is a static device (step S602). If the wireless station 101 is a static device (step S602: YES), the base station 102 transmits to the wireless station 101, configuration information for the RRC transition pattern (step S603). The RRC transition pattern is, for example, the transition timing of the RRC state. Next, the base station 102 stores to the memory, the configuration information transmitted at the step S603, for RRC transition pattern (step S604).

The base station 102 judges based on the configuration information stored at step S604, whether the current time is the transition timing for transitioning to the connected mode (step S605). If the current time is not the transition timing for transitioning to the connected mode (step S605: NO), the base station 102 proceeds to step S608.

At step S605, if the current time is the transition timing for transitioning to the connected mode (step S605: YES), the base station 102 judges that the wireless station 101 has transitioned to the connected mode and executes data communication with the wireless station 101 (step S606). The data communication at step S606, for example, includes the scheduling of data communication by the MAC control unit 412, and the transmission or the reception of radio waves by the PHY control unit 411.

The base station 102 judges based on the configuration information stored at step S604, whether the current time is the transition timing for the wireless station 101 to transition to the idle mode (step S607). If the current time is not the transition timing for the wireless station 101 to transition to the idle mode (step S607: NO), the base station 102 returns to step S606 and continues to perform the data communication.

At step S607, if the current time is the transition timing for transitioning to the idle mode (step S607: YES), the base station 102 judges that the wireless station 101 has transitioned to the idle mode (step S608). Here, the base station 102 retains the wireless parameter configured in the call setup at step S601, and uses the same wireless parameter in the next transition to the connected mode. At step S608, if the wireless station 101 is already in the idle mode, the base station 102 maintains the idle mode.

The base station 102 judges whether to release (detach) the NAS connection (step S609). If the NAS connection is not to be released (step S609: NO), the base station 102 returns to step S605. If the NAS connection is to be released (step S609: YES), the base station 102 ends a series of operations.

At step S602, if the wireless station 101 is not a static device (step S602: NO), the base station 102 judges whether the wireless station 101 transitions to the connected mode (step S610). At step S610, judgment of whether to transition to the connected mode can be performed, for example, based on whether there is a connection request from the wireless station 101. If the wireless station 101 is judged not to transition to the connected mode (step S610: NO), the base station 102 proceeds to step S614.

At step S610, if the wireless station 101 is judged to transition to the connected mode (step S610: YES), the base station 102 judges that the wireless station 101 has transitioned to the connected mode, and executes data communication with the wireless station 101 (step S611). The data communication at step S610, for example, includes the scheduling of data communication by the MAC control unit 412, the transmission or reception of radio waves by the PHY control unit 411, etc.

The base station 102 judges whether the wireless station 101 transitions to the idle mode (step S612). If the wireless station 101 is judged to not transition to the idle mode (step S612: NO), the base station 102 returns to step S611 and continues to perform the data communication.

At step S612, if the wireless station 101 is judged to transition to the idle mode (step S612: YES), the base station 102 transmits to the wireless station 101, an RRC connection release, and the wireless station 101 transitions to the idle mode (step S613).

The base station 102 judges whether to release the NAS connection (step S614). If the NAS connection is not to be released (step S614: NO), the base station 102 returns to step S610. If the NAS connection is to be released (step S614: YES), the base station 102 transmits to the wireless station 101, a control signal instructing the release of the NAS connection, and ends a series of operations.

In this manner, according to the wireless communications system of the second embodiment, the base station 102 receives from the wireless station 101, a RRC connection request (first control signal) that includes classifying information indicating that the wireless station 101 is a static device (specific classification). In this case, the base station 102 configures, via RRC connection setup or RRC connection reconfiguration (second control signal), the transition timing for transitioning to the connected mode (communication mode). Further, the transition to the configured communication mode is released by a control signal (third control signal) instructing the release of the NAS connection. As a result, if the wireless station 101 is not a static device, the RRC control signal overhead accompanying state transition is reduced, enabling communication efficiency to be facilitated.

In the wireless communications system according to a third embodiment, portions differing from the wireless communications system according to the second embodiment will be described.

The wireless station 101 according to the third embodiment notifies the base station 102 that the wireless station 101 is a static device, via UE capability. UE capability is, for example, specified under LTE Rel-10, and is information that notifies the base station 102, to which category the wireless station 101 belongs. As a result, the wireless station 101 can notify the base station 102 of the communication performance of the wireless station 101.

For example, a category, "Category 9" can be newly configured for a static device, and the value of the data size can be configured to be smaller (e.g., ⅛) than that of "Category 1". The wireless station 101 transmits to the base station 102, the UE capability, which indicates "Category 9". As a result, the base station 102 can judge that the wireless station 101 is a static device having a communication data size that is small.

FIG. 7 is a sequence diagram depicting one example of operation of obtaining the UE capability. The wireless station 101 and the base station 102, for example, execute the following steps at the time of call setup, for example. The base station 102 transmits to the wireless station 101, a UE capability enquiry requesting the UE capability (step S701).

The wireless station 101 transmits to the base station 102, UE capability enquiry information that includes "Category 9" (step S702). As a result, the base station 102 obtains the UE capability indicating "Category 9", and the base station 102 can judge that the wireless station 101 is a static device.

In this manner, according to the wireless communications system of the third embodiment, the wireless station 101 can notify the base station 102, that the wireless station 101 is a static device, via the UE capability.

In the wireless communications system according a fourth embodiment, portions differing from the wireless communications system according to the second embodiment or the third embodiment will be described.

Even if the wireless station 101 is a static device, the static device may not always be static such as in the case of a health meter or security sensor. Thus, the base station 102 transmits activation signals (Activation) and deactivation signals (Deactivation) to the wireless station 101. Activation is a signal instructing transition to a mode of performing state transition by a preconfigured timing. Deactivation is a third control signal instructing transition to a mode of configuring the transition timing for each data communication and performing state transition.

For example, even if the wireless station 101 is not a static device and "Category 9" is set in the category of the UE capability, the base station 102 can judge that the volume of data transmitted from the wireless station 101 is small. In this case, by transmitting Activation to the wireless station 101, the base station 102 can transition to the mode of performing state transition by a preconfigured timing, even if the wireless station 101 is not a static device.

Further, although the base station 102 performs communication by a mode of performing state transition by a preconfigured timing, if a mode of configuring the transition timing at each data communication and performing state transition is transitioned to, Deactivation is transmitted to the wireless station 101.

The transmission of Activation or Deactivation from the base station 102, for example, can be performed by the transmission of a physical downlink control channel (PDCCH) by the PHY control unit 411 or the MAC control unit 412. The reception of Activation or Deactivation by the wireless station 101, for example, can be performed by the reception of the PDCCH by the PHY control unit 311 or the MAC control unit 312.

FIG. 8 is a sequence diagram depicting one example of operation of the wireless communications system according to the fourth embodiment. The wireless station 101 and the base station 102 of the wireless communications system according to the fourth embodiment, for example, execute the following steps. In the initial state, the wireless station 101 and the base station 102 are respectively in the idle mode (Idle).

Steps S801 to S805 depicted in FIG. 8 are identical to steps S201 to S205 depicted in FIG. 2. After step S805, the base station 102 transmits Activation to the wireless station 101 (step S806). As a result, the wireless station 101 and the base station 102 transition to the mode of performing state transition by a preconfigured timing.

Steps S807 to S812 depicted in FIG. 8 are identical to steps S206 to S211 depicted in FIG. 2. After step S812, the base station 102 transmits Deactivation to the wireless station 101 (step S813). As a result, the mode of performing state transition by a preconfigured timing is released, and the wireless station 101 and the base station 102 transition to the mode of configuring the transition timing at each data communication and performing state transition.

A PDCCH can be used at the control signal giving notification of Activation and Deactivation, for example. Alternatively, a MAC control element (CE) can be used as the control signal giving notification of Activation and Deactivation.

FIG. 9 is a sequence diagram depicting one example of operation of transmission/reception of a MAC CE. When a MAC CE is used as the control signal giving notification of Activation and Deactivation, the wireless station 101 and the base station 102, for example, execute the following steps.

If the wireless station 101 is not a static device and "Category 9" is set in the category of the UE capability, the base station 102 transmits to the wireless station 101, a MAC CE giving notification of Activation (step S901). The wireless station 101 transmits to the base station 102, an ACK, which is a response signal for the MAC CE transmitted at step S901 (step S902). As a result, the wireless station 101 and the base station 102 transition to the mode of performing state transition by a preconfigured timing.

Further, if the mode of performing state transition by a preconfigured timing is to be terminated, the base station 102 transmits to the wireless station 101, a MAC CE giving notification of Deactivation (step S903). The wireless station 101 transmits to the base station 102, an ACK, which is a response signal for the MAC CE transmitted at step S903 (step S904). As a result, the wireless station 101 and the base station 102 transition to the mode of configuring the transition timing at each data communication and performing state transition.

FIG. 10 is a flowchart depicting one example of operation of the wireless station according to the fourth embodiment. If the wireless station 101 is static device, the wireless station 101 according to the fourth embodiment, for example, executes the steps depicted in FIG. 5. If the wireless station 101 is not a static device, the wireless station 101 according to the fourth embodiment, for example, executes the following steps. Steps S1001 to S1003 depicted in FIG. 10 are identical to steps S501 to S503 depicted in FIG. 5. However, at step S1001, the wireless station 101 does not notify the base station 102 that the wireless station 101 is a static device.

After step S1003, the wireless station 101 judges whether Activation via a PDCCH has been received from the base station 102 (step S1004). If Activation has not been received (step S1004: NO), the wireless station 101 ends a series of operations. If Activation has been received (step S1004: YES), the wireless station 101 proceeds to step S1005. Steps S1005 to S1007 depicted in FIG. 10 are identical to steps S504 to S506 depicted in FIG. 5.

At step S1007, if the transition timing for transitioning to the idle mode has arrived (step S1007: YES), the wireless station 101 judges whether Deactivation via a PDCCH has been received from the base station 102 (step S1008). If Deactivation has not been received (step S1008: NO), the wireless station 101 returns to step S1005. As a result, the wireless station 101 retains the wireless parameter configured in the call setup at step S1001, and uses the same wireless parameter for the next transition to the connected mode. If Deactivation has been received (step S1008: YES), the wireless station 101 ends a series of operations.

FIG. 11 is a flowchart depicting one example of operation of the base station according to the fourth embodiment. The base station 102 according to the fourth embodiment, for example, executes the following steps. The base station 102 performs call setup with the wireless station 101 (step S1101). The call setup at step S1101, for example, corresponds to the operations at steps S201 to S205 depicted in FIG. 2. Further, via the RRC connection request in the call setup at step S1101, the base station 102 obtains from the wireless station 101, information indicating whether the wireless station 101 is a static device.

The base station 102 transmits preconfiguration information of a RRC transition pattern to the wireless station 101 (step S1102). The RRC transition pattern is, for example, the transition timing of the RRC state. The base station 102 stores to the memory, the configuration information of the RRC transition pattern, transmitted at step S1102 (step S1103). The base station 102 judges based on the information obtained at step S1101, whether the wireless station 101 is a static device (step S1104). If the wireless station 101 is a static device (step S1104: YES), the base station 102 proceeds to step S1105. Steps S1105 to S1107 are identical to steps S605 to S607 depicted in FIG. 6.

At step S1107, if the transition timing for transitioning to the idle mode has arrived (step S1007: YES), the base station 102 judges whether to transmit Deactivation (step S1108). Judgment of whether to transmit Deactivation to the wireless station 101, for example, can be performed based on a state such as the moving state of the wireless station 101. For example, if the base station 102 obtains from the wireless station 101, information indicating the traveling speed of the wireless station 101 and the traveling speed of the wireless station 101 exceeds a threshold, the wireless station 101 is judged to be moving and Deactivation is transmitted.

At step S1108, if Deactivation is not to be transmitted (step S1108: NO), the base station 102 returns to step S1105. Here, the base station 102 retains the wireless parameter configured in the call setup at step S1101 and uses the same wireless parameter for the next transition to the connected mode. If Deactivation is to be transmitted (step S1108: YES), the base station 102 transmits Deactivation to the wireless station 101, via a PDCCH (step S1109), ending a series of operations.

At step S1104, if the wireless station 101 is not a static device (step S1104: NO), the base station 102 judges whether to transmit Activation to the wireless station 101 (step S1110). The judgment of whether to transmit Activation to the wireless station 101, for example, can be performed based on a state such as the moving state of the wireless station 101. For example, if the base station 102 obtains from the wireless station 101, information indicating the traveling speed of the wireless station 101 and the traveling speed of the wireless station 101 is less than or equal to a threshold for a given period or long, the wireless station 101 judges that the wireless station 101 is not moving and transmits Activation.

At step S1110, if Activation is not to be transmitted (step S1110: NO), the base station 102 proceeds to step S1112. Steps S1112 to S1116 depicted in FIG. 11 are identical to steps S610 to S614 depicted in FIG. 6. If Activation is to be transmitted (step S1110: YES), the base station 102 transmits Activation to the wireless station 101, via a PDCCH (step S1111), and proceeds to step S1105.

In this manner, according to the wireless communications system of the fourth embodiment, when the wireless station 101 is not a static device (the specific classification of a wireless station), the method of transitioning states can be switched according to the state (e.g., moving state) of the wireless station 101. More specifically, a state of performing communication mode transition based on the configuration of the second control signal and a state of performing communication mode transition irrespective of the configuration of the second control signal can be switched between, according to the state of the wireless station 101.

As a result, if the wireless station 101 is a static device, a mode of state transition can be switched between a mode in which the state transition is performed by a predetermined configuration timing and a mode in which the state transition is performed by configuring the transition timing at each data communication, according to the state of the wireless station 101. For example, if the wireless station 101 is not moving, by configuring the mode of performing state transition by a predetermined configuration timing, communication efficiency can be facilitated. Further, if the wireless station 101 is moving, by configuring the mode of performing state transition by configuration at each data communication, improved communication quality can be facilitated.

Figure 12:
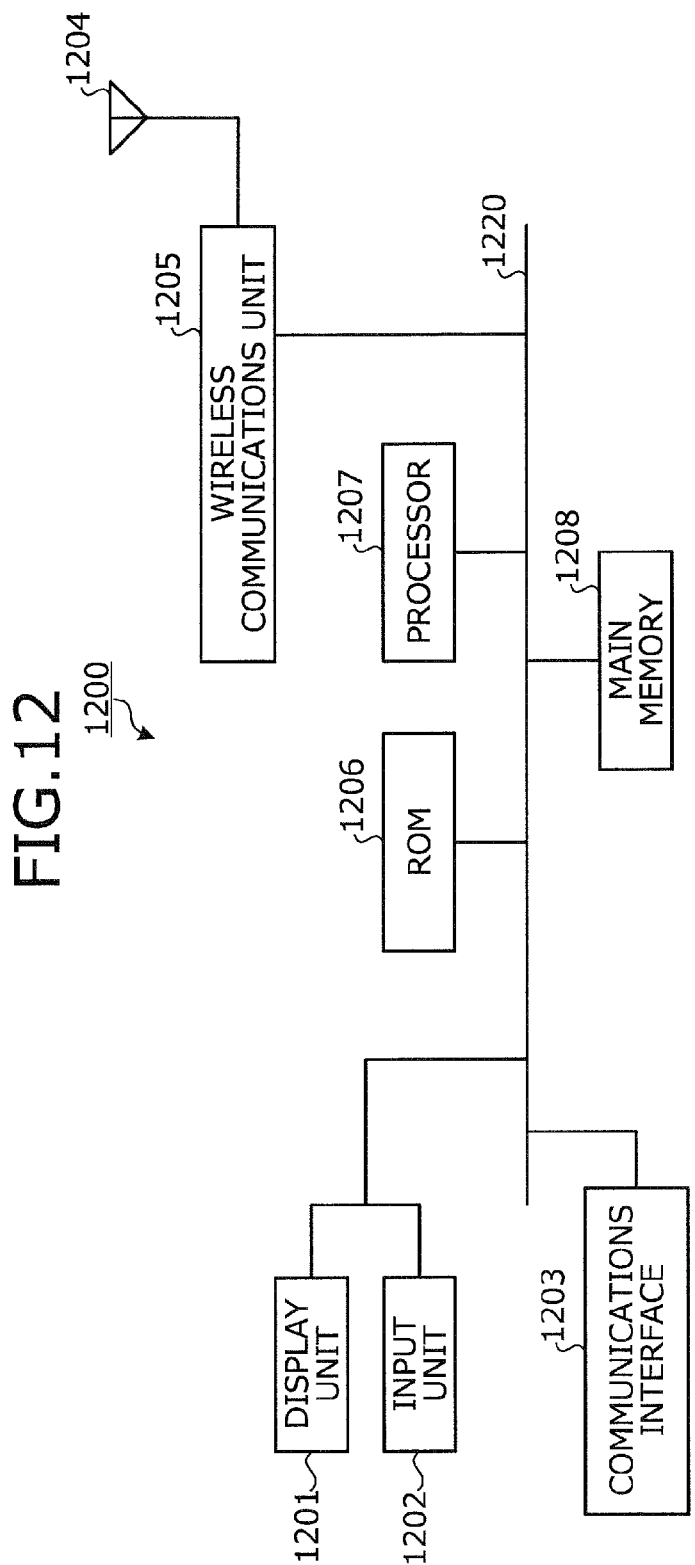
FIG. 12 is a diagram of one example a hardware configuration of the wireless station.

FIG. 12 is a diagram of one example a hardware configuration of the wireless station. The wireless station 101 of each of the embodiments described above, for example, can be implemented by a communications apparatus 1200 depicted in FIG. 12. The communications apparatus 1200 includes a display unit 1201, an input unit 1102, a communications interface 1203, an antenna 1204, a wireless communications unit 1205, read-only memory (ROM) 1206, a processor 1207, a main memory 1208, and a bus 1220.

The display unit 1201, the input unit 1102, the communications interface 1203, the wireless communications unit 1205, the ROM 1206, and the main memory 1208 are connected, via the bus 1220, to the processor 1207.

The display unit 1201 is a user interface that displays information for the operator. The display unit 1201, for example, is a liquid crystal display. The input unit 1102 is a user interface that receives input of information from the operator. The input unit 1102, for example, is a keypad or the like. The operator of the communications apparatus 1200 operates the communications apparatus 1200 by using the display unit 1201 and the input unit 1102, such as to input a telephone number.

The communications interface 1203, for example, is a speaker and a microphone. The operator of the communications apparatus 1200 uses the communications interface 1203 for audio telephone calls.

The antenna 1204 is connected to the wireless communications unit 1205. The wireless communications unit 1205 performs wireless communication via the antenna 1204 and under the control of the processor 1207.

The ROM 1206, for example, stores programs for executing various types of processes. The processor 1207 reads out various types of programs stored on the ROM 1206, loads the read program onto the main memory 1208, and executes various types of processes. A central processing unit (CPU), a field programmable gate array (FPGA), and the like may be used as the processor 1207, for example.

The antenna 322 depicted in FIG. 3, for example, may be implemented by the antenna 1204. The communications unit 321 depicted in FIG. 3, for example, may be implemented by the processor 1207 and the wireless communications unit 1205. The control unit 310 depicted in FIG. 3, for example, may be implemented by the ROM 1206, the processor 1207, and the main memory 1208.

Figure 13:
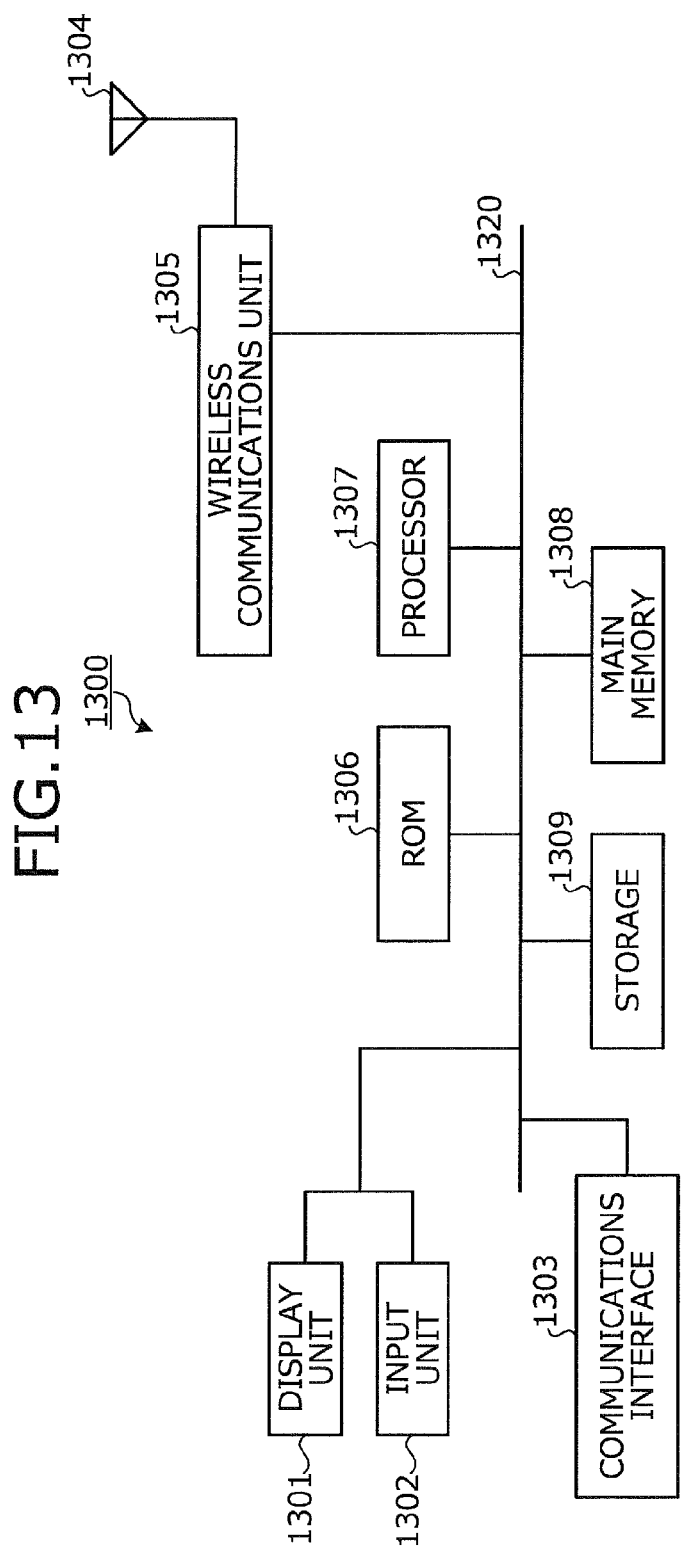
FIG. 13 is a diagram depicting one example of a hardware configuration of the base station.

FIG. 13 is a diagram depicting one example of a hardware configuration of the base station. The base station 102 according the embodiments described above, for example, may be implemented by a communications apparatus 1300 depicted in FIG. 13. The communications apparatus 1300 includes a display unit 1301, an input unit 1302, a communications interface 1303, an antenna 1304, a wireless communications unit 1305, ROM 1306, a processor 1307, main memory 1308, storage 1309, and a bus 1320.

The display unit 1301, the input unit 1302, the communications interface 1303, the wireless communications unit 1305, the ROM 1306, the main memory 1308, and the storage 1309 are connected, via the bus 1320, to the processor 1307.

The display unit 1301 is a user interface that displays information for the operator. The display unit 1301, for example, is a monitor. The input unit 1302 is a user interface that receives the input of information from the operator. The input unit 1302, for example, is a keyboard. The operator of the communications apparatus 1300 operates the communications apparatus 1300 by using the display unit 1301 and the input unit 1302, such as for inputting information for a setup program.

The communications interface 1303, for example, is a communications interface for communicating with higher level stations. The communications interface 1303, for example, is a network interface, an analog/digital converter (ADC), etc.

The antenna 1304 is connected to the wireless communications unit 1305. The wireless communications unit 1305 performs wireless communication, via the antenna 1304 and under the control of the processor 1307.

The ROM 1306, for example, stores programs for executing various types of processes. The processor 1307 reads out various types of programs stored on the ROM 1306, loads the read program onto the main memory 1308, and executes various types processes. A CPU, FPGA, and the like may be used as the processor 1307, for example. The storage 1309, for example, is a storage apparatus such as a hard disk. For example, a function of a buffer is implemented by the storage 1309 and the processor 1307.

The antenna 422 depicted in FIG. 4, for example, may be implemented by the antenna 1304. The physical-line interface 423 depicted in FIG. 4, for example, may be implemented by the communications interface 1303. The communications unit 421 depicted in FIG. 4, for example, may be implemented by the processor 1307 and the wireless communications unit 1305. The control unit 410 depicted in FIG. 4, for example, may be implemented by the ROM 1306, the processor 1307, and the main memory 1308.

As described, the wireless communications system, the wireless station, the base station, and the communications method enable communication efficiency to be facilitated.

In the mode of performing state transition by a preconfigured timing, the wireless station 101, which is a static device, does not move and therefore, although deviation of uplink synchronization is low, the timing of uplink transmission may deviate gradually consequent to the precision of the clock of the static device. Therefore, operation may be such that when a given period has elapsed since the time when the connected mode is entered, the wireless station 101 and the base station 102 again implement the random access procedure.

According to one aspect of the present invention, communication efficiency can be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
   a base station; and
   a wireless station, wherein
   the base station, after receiving a first control signal of Radio Resource Control (RRC) protocol including classifying information, configures transition to an RRC connected mode by a second control signal of RRC protocol transmitted from the base station to the wireless station or from the wireless station to the base station, and
   the wireless station transitions to the connected mode by the second control signal, and upon transition from the connected mode to a state other than the connected mode, stores a wireless parameter and a security parameter that are set by the RRC protocol and used in data communication in the connected mode.

2. The wireless communications system according to claim 1, wherein
   the wireless station stores a plurality of wireless parameters including the wireless parameter.

3. The wireless communications system according to claim 1, wherein
the wireless station stores a plurality of security parameters including the security parameter.

4. The wireless communications system according to claim 2, wherein
the wireless station stores a plurality of security parameters including the security parameter.

5. The wireless communications system according to claim 1, wherein
the first control signal is a signal that is transmitted from the wireless station and indicates that a classification of the wireless station is a specific classification.

6. The wireless communications system according to claim 1, wherein
the second control signal indicates a timing to transition to the connected mode during which the base station and the wireless station are enabled to perform data communication, and
the base station and the wireless station transition to the connected mode at the timing indicated by the second control signal and perform data communication.

7. The wireless communications system according to claim 1, wherein
upon transition from the state other than the connected mode to the connected mode, the wireless station performs communication based on the wireless parameter.

8. The wireless communications system according to claim 6, wherein
the state other than the connected mode is an idle state,
the timing is a timing at which the connected mode and the idle mode are switched in a constant cycle, and
the wireless station periodically transmits data to the base station.

9. A wireless station that performs wireless communication by preconfiguring transition to a Radio Resource Control (RRC) connected mode, the wireless station comprising:
a processor configured to:
receive from or transmit to a base station, after transmitting a first control signal of RRC protocol including classifying information to the base station, a second control signal of RRC protocol configuring the transition to the connected mode; and
control the transition to the connected mode configured according to the second control signal; and
memory configured to store, upon transition from the connected mode to a state other than the connected mode, a wireless parameter and a security parameter that are set by the RRC protocol and used in communication in the connected mode.

10. The wireless station according to claim 9, wherein
the memory stores a plurality of wireless parameters including the wireless parameter.

11. The wireless station according to claim 9, wherein
the memory stores a plurality of security parameters including the security parameter.

12. The wireless station according to claim 10, wherein
the memory stores a plurality of security parameters including the security parameter.

13. A base station that performs wireless communication by preconfiguring a transition to a Radio Resource Control (RRC) connected mode, the base station comprising:
a transceiver configured to receive a first control signal of RRC protocol including classifying information from a wireless station, and transmits to or receive from the wireless station, a second control signal of RRC protocol configuring the transition to the connected mode;
a processor configured to:
control, after transmitting or receiving the second control signal, wireless communication to be performed at a preconfigured first timing to transition to a first connected mode; and
perform, upon transition from a state other than the first connected mode to a second connected mode after transition from the first connected mode to the state other than the first connected mode, wireless communication using a wireless parameter and a security parameter that are stored in the wireless station and set by the RRC protocol in the first connected mode.

14. The base station according to claim 13, further comprising
memory that stores a plurality of wireless parameters including the wireless parameter.

15. The base station according to claim 13, further comprising
memory that stores a plurality of security parameters including the security parameter.

16. The base station according to claim 14, wherein
the memory stores a plurality of security parameters including the security parameter.

* * * * *